United States Patent
Moses et al.

(10) Patent No.: US 10,850,395 B2
(45) Date of Patent: Dec. 1, 2020

(54) SYSTEM AND METHODS FOR MULTIPLE-PLACE SWARM FORAGING WITH DYNAMIC DEPOTS

(71) Applicant: STC.UNM, Albuquerque, NM (US)

(72) Inventors: Melanie E. Moses, Albuquerque, NM (US); Joshua P. Hecker, Albuquerque, NM (US); Qi Lu, Albuquerque, NM (US)

( * ) Notice: Subject to any disclaimer, the term of this patent is extended or adjusted under 35 U.S.C. 154(b) by 225 days.

(21) Appl. No.: 15/985,213

(22) Filed: May 21, 2018

(65) Prior Publication Data

US 2018/0333855 A1 Nov. 22, 2018

Related U.S. Application Data

(60) Provisional application No. 62/508,763, filed on May 19, 2017.

(51) Int. Cl.
*B25J 9/00* (2006.01)
*B25J 9/16* (2006.01)
(Continued)

(52) U.S. Cl.
CPC ........... *B25J 9/1666* (2013.01); *B25J 9/0084* (2013.01); *B25J 9/162* (2013.01); *B25J 9/1676* (2013.01);
(Continued)

(58) Field of Classification Search
CPC ........ B25J 9/0084; B25J 9/162; B25J 9/1666; B25J 9/1676; B25J 11/008; B25J 19/02;
(Continued)

(56) References Cited

U.S. PATENT DOCUMENTS

| | | | |
|---|---|---|---|
| 7,363,124 B1 * | 4/2008 | Duarte | F41H 7/005 701/23 |
| 8,112,374 B2 * | 2/2012 | Van Dyke Parunak | G06F 16/35 706/45 |

(Continued)

OTHER PUBLICATIONS

Lu, Q., Hecker, J.P. & Moses, M.E. Multiple-place swarm foraging with dynamic depots. Auton Robot 42, 909-926 (2018). https://doi.org/10.1007/s10514-017-9693-2 (Year: 2018).*

(Continued)

*Primary Examiner* — Robert T Nguyen
(74) *Attorney, Agent, or Firm* — Valauskas Corder LLC (57) ABSTRACT

Teams of robots can be organized to collectively complete complex real-world tasks, for example collective foraging in which robots search for, pick up, and drop off targets in a collection zone. A dynamic multiple-place foraging algorithm (MPFAdynamic) is a scalable, flexible, and efficient algorithm for robot swarms to collect objects in unmapped environments. It achieves scalability through a decentralized architecture in which robots search without central control, and then return to mobile depots which provide collection and communication points. Mobile depots move closer to clusters of targets as robots discover them, which reduces robot transport time as well as collisions among robots. Flexibility is achieved by incorporating individual robot behaviors in which robots move and communicate in ways that mimic the foraging behaviors of ants. The MPFAdynamic algorithm demonstrates that dispersed agents that dynamically adapt to local information in their environment provide more flexible and scalable swarms.

14 Claims, 10 Drawing Sheets

(51) Int. Cl.
  *G05D 1/00* (2006.01)
  *G06N 3/00* (2006.01)
  *B25J 11/00* (2006.01)
  *B25J 19/02* (2006.01)

(52) U.S. Cl.
  CPC ............ *B25J 11/008* (2013.01); *B25J 19/02* (2013.01); *G05D 1/0088* (2013.01); *G06N 3/008* (2013.01); *G05B 2219/39146* (2013.01); *G05B 2219/39168* (2013.01)

(58) Field of Classification Search
  CPC ........... G05B 2219/39146; G05B 2219/39168; G05D 1/0088; G06N 3/008
  See application file for complete search history.

(56) References Cited

U.S. PATENT DOCUMENTS

| | | | | |
|---|---|---|---|---|
| 9,242,799 | B1* | 1/2016 | O'Brien | B65G 1/1371 |
| 9,446,512 | B1* | 9/2016 | Moses | G05D 1/0088 |
| 2006/0161405 | A1* | 7/2006 | Munirajan | G06N 3/008 |
| | | | | 703/6 |
| 2014/0365258 | A1* | 12/2014 | Vestal | G06Q 10/063114 |
| | | | | 705/7.15 |

OTHER PUBLICATIONS

Talamali, M.S., Bose, T., Haire, M. et al. Sophisticated collective foraging with minimalist agents: a swarm robotics test. Swarm Intell 14, 25-56 (2020). https://doi.org/10.1007/s11721-019-00176-9 (Year: 2019).*

Q. Lu and M. E. Moses, "A Bio-Inspired Transportation Network for Scalable Swarm Foraging: Extended Abstract," 2019 International Symposium on Multi-Robot and Multi-Agent Systems (MRS), New Brunswick, NJ, USA, 2019, pp. 53-55, doi: 10.1109/MRS.2019.8901050. (Year: 2019).*

Q. Lu, J. P. Hecker and M. E. Moses, "The MPFA: A multiple-place foraging algorithm for biologically-inspired robot swarms," 2016 IEEE/RSJ International Conference on Intelligent Robots and Systems (IROS), Daejeon, 2016, pp. 3815-3821, doi: 10.1109/IROS.2016.7759561. (Year: 2016).*

Gordon et al., "Founding, foraging, and fighting: Colony size and the spatial distribution of harvester ant nests.", Ecological Society of America,77(8), Dec. 1996.

Liu et al., "Modeling and optimization of adaptive foraging in swarm robotic systems", International Journal of Robotics Research, 29(14), Dec. 1, 2010.

Winfield, "Foraging Robots", pp. 3682-3700, Springer New York, New York, NY, 2009.

* cited by examiner

Algorithm 1 Multiple-Place Foraging Algorithm

1: Disperse from depot to random location
2: while experiment running do
3:    Conduct uninformed correlated random walk
4:    if target found then
5:      Collect it
6:      Sense targets $c$ near current location $l_f$
7:      Return to the closest depot to deliver target
8:      if $Pois(c, \lambda_{lp}) > U(0, 1)$ then
9:        Lay pheromone to $l_f$
10:      end if
11:      if $Pois(c, \lambda_{sf}) > U(0, 1)$ then
12:        Return to $l_f$
13:        Conduct informed correlated random walk
14:      else if pheromone found then
15:        Travel to pheromone location $l_p$
16:        Conduct informed correlated random walk
17:      else
18:        Choose new random location
19:      end if
20:    end if
21: end while

FIG. 5

| Parameter | Description | Initialization |
|---|---|---|
| $\sigma$ | Uniformed search variation | $U(0, \pi)$ |
| $p_s$ | Prob. of switching to search | $U(0, 1)$ |
| $p_r$ | Prob. of giving up search | $U(0, 1)$ |
| $\lambda_{id}$ | Rate of informed search decay | $Exp(0.2)$ |
| $\lambda_{sf}$ | Rate of following site fidelity | $U(0, 20)$ |
| $\lambda_{lp}$ | Rate of laying pheromone | $U(0, 20)$ |
| $\lambda_{pd}$ | Rate of pheromone decay | $Exp(0.1)$ |

SYSTEM AND METHODS FOR MULTIPLE-PLACE SWARM FORAGING WITH DYNAMIC DEPOTS

CROSS-REFERENCE TO RELATED APPLICATIONS

This application claims the benefit of U.S. Provisional Patent Application No. 62/508,763 filed May 19, 2017, incorporated by reference.

STATEMENT REGARDING FEDERALLY SPONSORED RESEARCH OR DEVELOPMENT

This invention was made with government support under MUREP #NNX15AM14A awarded by the National Aeronautics and Space Administration. The government has certain rights in the invention.

FIELD OF THE INVENTION

The invention relates generally to swarm robotics. More specifically, the invention is directed to improved foraging performance of robotic swarms using methods for multiple-place foraging with dynamic depots.

BACKGROUND

Swarm behavior, or swarming, is a collective behavior exhibited by entities, particularly animals, of similar size which aggregate together. Swarm robotics is directed to the coordination of multirobot systems comprising a large number of physical robots. Swarm robotics is used to achieve a desired collective behavior that emerges from the interactions between the robots and interactions of robots with the environment. Swarm robotics research aims to design robust, scalable, and flexible collective behaviors for multiple autonomous robots. Simple rules and local interactions among individual robots result in desired collective swarm behavior by self-organized coordination mechanisms. Certain biological studies have revealed self-organized coordination mechanisms in social insects which can be effectively implemented in swarm robotics systems.

One behavior of interest of robot swarms is "foraging" behavior. Robots must retrieve objects from an environment and bring them back to a depot (or nest). Effective collective foraging requires coordination, navigation, and communication and is therefore a useful abstraction of many complex, real-world applications such as humanitarian de-mining, search and rescue, intrusion tracking, collection of hazardous materials, and space exploration. In particular, foraging is commonly used as a testbed for collective exploration, collective transport, and collective decision-making.

Central-place foraging is a canonical collective task commonly studied in swarm robotics. Robots depart from a centrally-placed depot to search for targets and return to this central place to deliver targets. The central-place foraging task can be instantiated into a number of real-world target collection applications, including crop harvesting and extra-planetary resource collection. One known central-place foraging algorithm (CPFA) was designed to emulate seed-harvester ant behaviors governing memory, communication, and movement. CPFA uses one collection depot. Although the behaviors of this CPFA emulate harvester ant foraging that maximizes the number of targets collected in short foraging time periods, it is not designed for complete target collection.

Distributed deterministic spiral algorithm (DDSA) used for foraging is a deterministic benchmark for central-place foraging that is designed to collect the nearest targets first. When compared to the CPFA, robot swarms using the DDSA were faster at complete collection tasks. However, the CPFA outperforms the DDSA by collecting more targets in fixed time windows for large swarms, for example, those with more than 20 robots. The DDSA suffers from more robot collisions in more crowded environments.

Although the CPFA is more scalable than the DDSA, CPFA swarms typically exhibit diminishing returns as swarm size increases (i.e. sublinear scaling of foraging rate per robot given larger numbers of robots in the swarm). Diminishing returns are expected for central-place foraging because robots in larger swarms on average travel farther to collect more targets, and there are more collisions given more robots.

Previous work has demonstrated that a single, central depot cannot serve a large number of robots efficiently due to long travel times and heavy crowding. To mitigate this issue, the multiple-place foraging algorithm (MPFA) was developed with multiple static depots (MPFAstatic), where robots are programmed to always return to the depot closest to the position of the target that the robot has found.

The MPFA was primarily inspired by behaviors observed in groups of insects and primates, as well as the immune system. For example, polydomous colonies of Argentine ants are comprised of multiple nests spanning hundreds of square meters; additionally, a certain study showed that wasps living in multiple nests have greater survival rates and increased productivity. It was also shown that communities of spider monkeys can be considered as multiple central-place foragers (MCPF), where monkeys select a sleeping site close to current feeding areas, and the MCPF strategy entails the lowest travel costs. In another biological system, it was shown that the decentralized, sub-modular nature of the immune system increases the foraging efficiency of immune cells that aggregate in lymph nodes distributed throughout the body. These dispersed aggregation points (analogous to multiple nests) speed up immune response rates, particularly in large animals that may have trillions of immune cells. Recently dynamic lymph nodes that appear near sites of infection have been discovered motivating the use of depots as dynamic aggregation points for robotic foraging.

The use of dynamic docks was introduced demonstrating that mobile docks mitigate the spatial interference and improve overall task performance when mobile robots execute a transportation task and periodically recharge from a docking station.

Multiple-place foraging also resembles the task allocation of global courier and delivery services, which use many distributed stores to collect and deliver packages efficiently. Several studies on task allocation in robot swarms have used biologically-inspired approaches in the deployment of homogeneous swarms of robots to multiple sites. These robots autonomously redistribute themselves among the candidate sites to ensure task completion by optimized stochastic control policies. In general, each swarm is modeled as a hybrid system where agents switch between maximum transfer rates and constant transition rates.

The use of multiple collection depots is the fundamental difference between the CPFA and the MPFA. MPFA mitigates the effects and outperforms central-place foraging swarms, but the MPFA is not capable of dynamically adapting to different target distributions.

There is a need for an effective, decentralized search-and-collection foraging algorithm for ant-like robot swarms that mitigates scaling limitations and improves performance of robots retrieval of objects from an environment and returned to a depot. The invention satisfies this need.

SUMMARY

The invention is directed to multiple-place foraging algorithm with dynamic depots (MPFAdynamic). Depots are special robots which are able to carry multiple targets. Targets are objects such as mineral resources, hazardous waste, or any item that needs to be retrieved from the environment and gathered at a location. The final delivery of targets that are collected by the depots depends on the application. Targets may be processed at the dispersed locations where they are collected; they may be collected by another larger robotic agent that empties depots and delivers their contents to a central location; or, as the depots become full, they may drive the targets to the desired location.

A plurality of foraging robots may gather target objects without the use of a pre-programed map of an area of operation through the use of a foraging algorithm. The foraging robots may collect and deliver the target objects to a collection point, or depot, which itself may be a robot capable of carrying multiple target objects. Foraging robots may depart a depot in search of a target object, and, if the foraging robot encounters a target object, the foraging robot may transport the target object to the nearest depot, which may be a different from the depot from which the foraging robot departed. Certain information from the foraging robot regarding the location of the target objects may be relayed to the depot, which may then store, and then use the target object location information to reposition the depot to a location closer to the source of the target objects. The target object location information regarding the location of the target objects relative to the depot's position may also be shared to other foraging robots, thereby eliminating the need for a centralized control system to share the information with the remaining foraging robots.

In other certain embodiments of the invention, a foraging robot may be directed through the use of a foraging algorithm to depart from a depot in search of a target object in a random, uninformed search pattern until a target object is located, and, if no target object is found, the foraging robot may return to the nearest depot and eventually resume the search. If a target object is found, the foraging robot may retrieve the object and then return to the site of the target object and resume the search for any remaining target objects. A foraging robot may communicate the location of the target objects through "pheromones", or simulated way points, which may recruit other foraging robots to the location of the target objects.

Advantageously, the use of certain embodiments of the foraging algorithm may drastically increase the efficiency of the foraging robots to collect and return the target objects to a depot since the foraging robots are not required to transport the target object to the original depot from which it originated, but rather seek out the nearest depot to deliver the target objects. Moreover, in contrast to static depots, the mobile nature of the depots to reposition dynamically to a site near a source of target objects may reduce the incidence of collision between large numbers of foraging robots returning to a depot. Mobile depots improve swarm foraging performance, specifically: (i) the time required to collect a fixed fraction of the targets (foraging time), (ii) the time required to detect and avoid collisions with other robots (collision time), (iii) the time that a robot spends searching for targets (search time), and (iv) the time that a robot spends traveling to and from a depot when collecting targets (travel time).

The algorithms CPFA, MPFAstatic, MPFAglobal_static, MPFAdynamic, MPFAglobal_dynamic are reviewed and compared for how quickly targets are collected: across different distributions of targets. The algorithm according to the invention, MPFAdynamic, outperforms both the CPFA and the MPFAstatic on all performance criteria. MPFAdynamic performs approximately as well as MPFAglobal_static and MPFAglobal_dynamic—versions of the MPFA that rely upon global knowledge of target locations to determine depot locations—without depending on global communication. This is a significant advantage of MPFAdynamic because global information is costly to obtain, and reliance on centralized communication is a single point of failure and efficiency bottleneck.

Scalability is determined by increasing the number of robots in the swarm and the size of the experimental arena. MPFAdynamic has better scalability than other algorithms: increasing the arena size has a smaller negative effect on the foraging time of swarms using MPFAdynamic, and increasing swarm size in a large arena has a larger positive effect on the foraging time of those swarms. In addition, MPFAdynamic is implemented with depots that transport their targets to a central depot, thus completing the central-place foraging task.

These features and advantages of the present invention will become more fully apparent from the following description and appended claims or may be learned by the practice of the invention as described below.

BRIEF DESCRIPTION OF THE DRAWINGS

The present invention can be better understood by reading the following detailed description of certain preferred embodiments, reference being made to the accompanying drawings in which.

DETAILED DESCRIPTION

Foraging robots depart from a depot to forage for targets and then return to the closest depot to deliver these targets (the closest depot may be different from the one the robot departed from). Depots move to new locations based on the mean positions of the remaining targets sensed by the robots. The positions of the sensed targets are stored at each depot when each foraging robot returns to that depot. The stored positions are relative to the depot's current location so that no central controller is needed to facilitate information sharing across the swarm.

Figure 1:
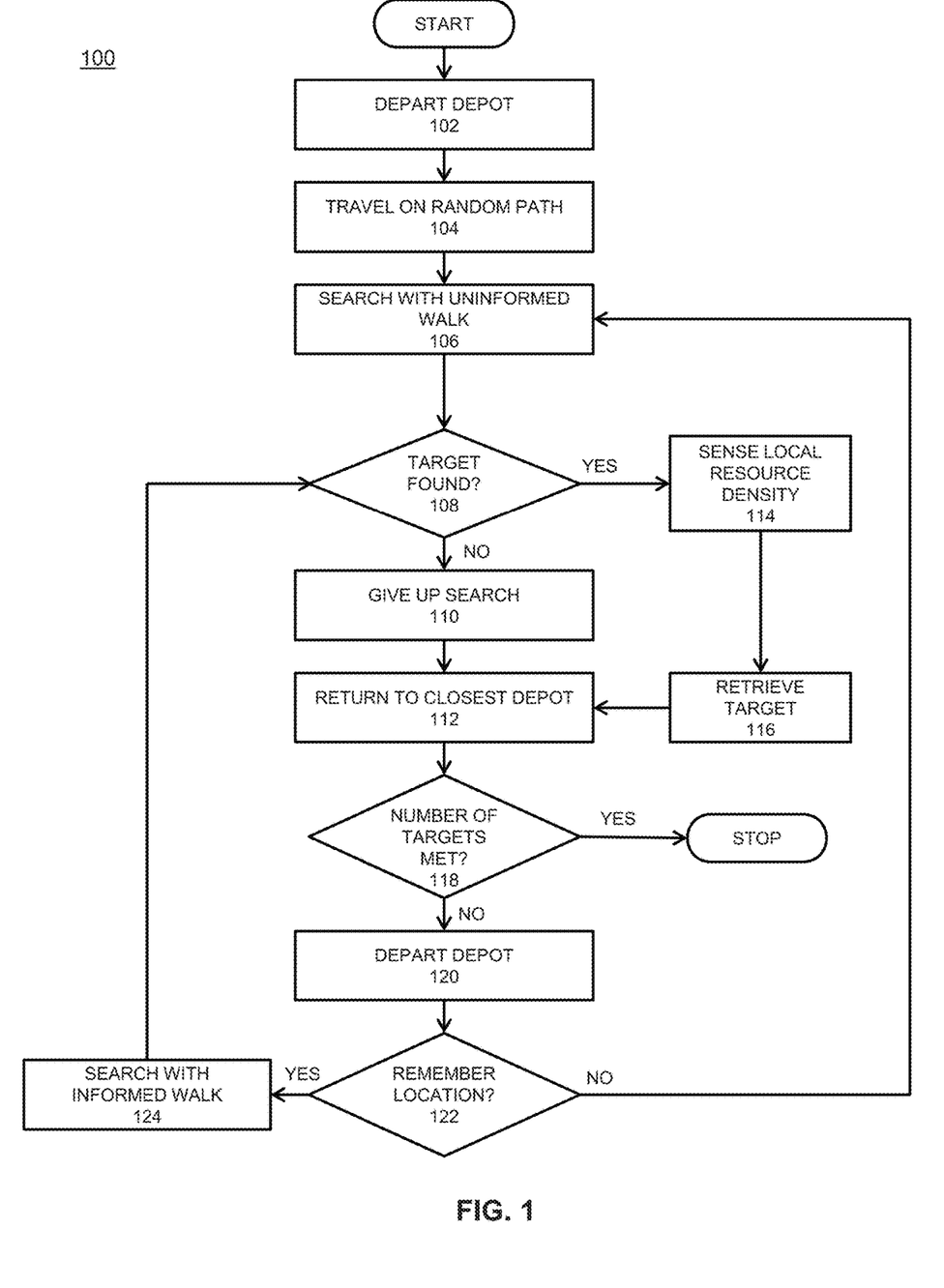
FIG. 1 illustrates a flow chart of the steps performed by a method for multiple-place swarm foraging according to an embodiment of the invention.

FIG. 1 illustrates a flow chart of the steps performed by a method 100 for multiple-place swarm foraging according to an embodiment of the invention. A robot initially disperses from a depot at step 102 and follows a randomly selected travel path at step 104. Upon reaching the end of the travel path, the robot switches to searching for targets using an uninformed correlated random walk (in which the robot has no knowledge of target locations) at step 106. If the robot does not find a target at step 108, the search terminates at step 110 and the robot moves to the closest depot at step 112.

If a target is found at step 108, the robot senses the local resource density at step 114. The density is the number of targets sensed in the local region by robots. The size of the region a robot can detect is described more fully below. The robot retrieves the target at step 116 and delivers it to the closest depot at step 112. If a certain number of targets have been collected by the depot at step 118, the method is complete. The number of targets to be met may be a predetermined number or dynamic threshold number. If this number of targets collected by the depot has not been met at step 118, the robot departs the depot at step 120. An individual robot may remember the location of a previously found target and repeatedly return to the same location, a process called site fidelity. Robots can also communicate using pheromones which are simulated as artificial way points to recruit robots to known clusters of targets. Robots that remember the location of a previously found target at step 122 will return to that previously found target site using site fidelity or pheromone recruitment and will search the target site thoroughly using an informed correlated random walk at step 124. At step 108, it is determined whether or not a target has been found. Robots that do not remember the location of a previously found target at step 122 will return to step 106 and search for targets using an uninformed walk.

The search strategy is evolved by a genetic algorithm (GA); all robots use the same strategy, but make decisions probabilistically based on the interaction with the environment. Although robots are able to depart from and return to the nearest depot, robots still search globally, meaning that they are able to travel across the entire arena.

Pheromone trails are simulated using pheromone waypoints, which are only reported to the closest depot to the robot when it arrives at the depot. Robots can only send and receive pheromone waypoints when they are returning to a depot. An exponential decay function with a decay rate is selected by the GA to simulate the pheromone decay process. After a certain amount of time, the pheromone waypoint will have decayed below a threshold and will be removed from the depot's list. When a robot arrives at the depot, it will probabilistically select a waypoint from that depot's list and travel to the location of the waypoint. The robot may also probabilistically choose to locally share information by sending pheromone waypoints to its current depot. The pheromone waypoints associated with a given depot are only locally available to robots returning to that depot.

Since robots always return to the closest depot with a found target, the sensed information relevant to a given target neighborhood is always associated with the depot closest to the position of the identified neighborhood. Thus, the robots only travel from the closest depot to any given pheromone waypoint.

Because pheromone waypoints are distributed across multiple depots, MPFA swarms require less communication among robots, and individual robots spend less time traveling back to the closest depot to make use of the information. Although certain methods use pheromone waypoints that are globally available to the entire swarm, these robots have access to more information such that individual robots take longer to travel back to the central depot and use the information. The GA balances these trade-offs automatically by tuning the search strategies and optimizing the performance of each swarm, resulting in systematic changes in parameters governing pheromone laying and distance traveled from the depot as more depots are added.

The invention improves swarm foraging performance with depots that move to the centroid of known nearby targets in order to minimize the time and distance for foraging robots to transport those targets. If all of the positions of the targets are known, this positional information can be used to calculate the optimal location of depots to minimize travel distance to all targets. This problem is analogous to clustering targets based on their distances to the closest depot, where the sum of distances between targets to the center of the cluster is minimum.

Figure 2:
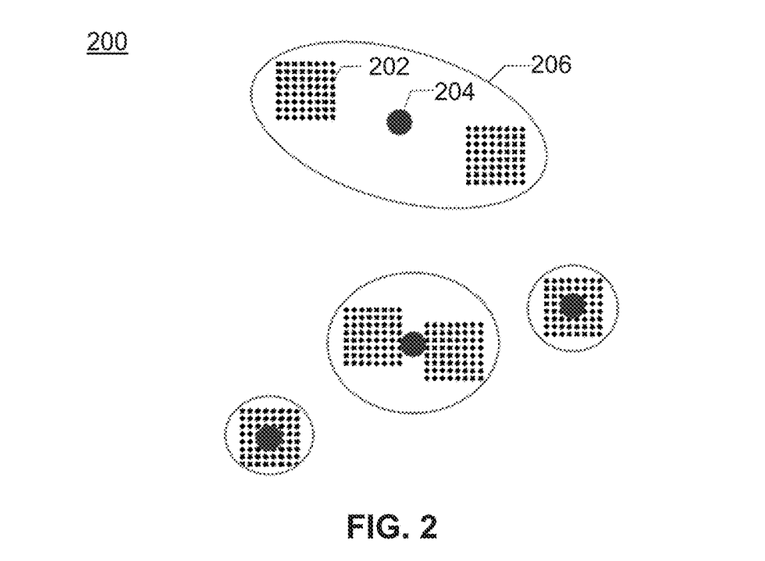
FIG. 2 illustrates a diagram of a system including dynamically allocated depots according to an embodiment of the invention.

Given the locations of all targets in the arena, the k-means++ clustering algorithm calculates the locations of depots to minimize the travel distance required to collect all targets. FIG. 2 shows an example of a system 200 including dynamically allocated depots 204, in which six piles of targets 202 are classified into four clusters 206 and four depots 204 are placed at the centroids of these clusters 206.

According to the invention, depots move to new locations based on the locations of the targets sensed by robots. Depots always move to the centroid of recently sensed targets, which are maintained in a list and updated whenever site fidelity or pheromone waypoints are used. If site fidelity is not used, or if pheromone waypoints decay, then those sensed targets are removed from the list and no longer contribute to the dynamic calculation of the depot's centroid.

The use of mobile depots is the fundamental difference between MPFAstatic and MPFAdynamic. As in MPFAstatic, depots are initially distributed uniformly in MPFAdynamic, and robots are evenly distributed to each depot. Depots move to new locations based on the positional information of observed targets sensed by foraging robots.

Figure 3:
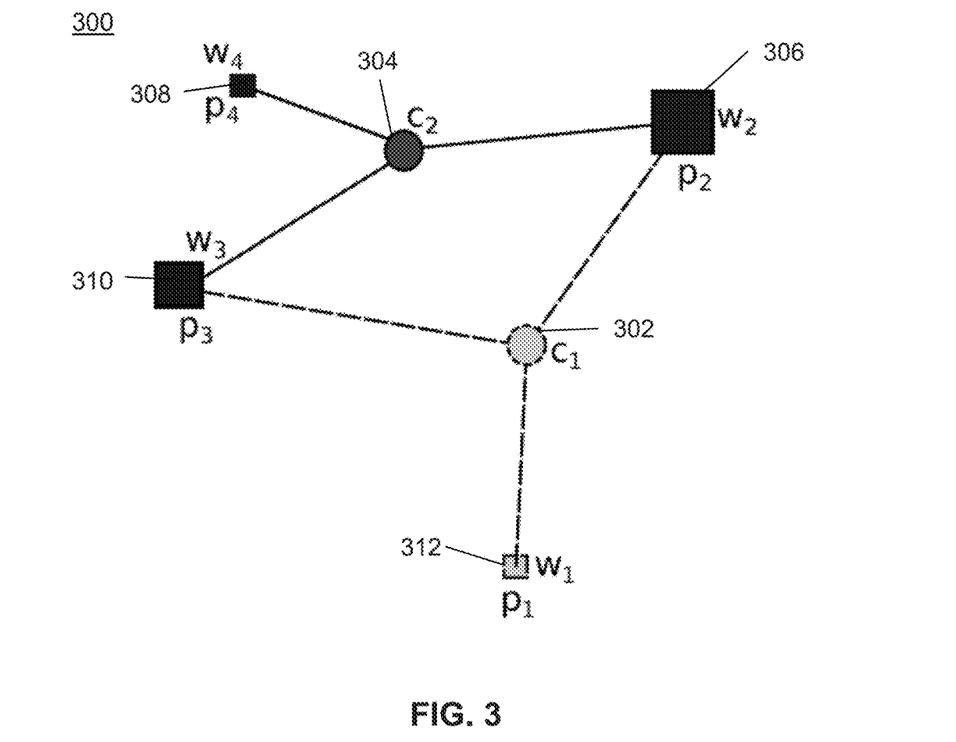
FIG. 3 illustrates a diagram of an environment including dynamic depots according to an embodiment of the invention

FIG. 3 illustrates a diagram of an environment 300 including dynamic depots according to an embodiment of the invention. As shown in FIG. 3, depot 302 is located at centroid $c_1$. Centroid $c_1$ is the center of the sensed targets 306, 308, 310. Each sensed target 306, 308, 310 is defined by position $(p_1, p_2, p_3, \ldots p_x)$ and a number of targets $(w_1, w_2, w_3, \ldots w_x)$ at each position. After some time, if targets 312 at position $p_1$ are completely collected by robots, then the pheromone waypoints at $p_1$ decays. Each pheromone trail is represented by a starting waypoint and an ending waypoint at a depot, e.g., depot 302. Waypoints provide positional information maintained in lists in which pheromone strength of each waypoint decreases exponentially over time, as described by Equation 4 below. Waypoints are removed once their values drop below a threshold. According to one embodiment, the threshold value may be 0.001, but any value is contemplated. If, at the same time, $w_4$ targets are sensed at a new location $p_4$, then the depot 304 will move to the centroid $c_2$ of the sensed targets at positions $p_2$, $p_3$, and $p_4$.

Figure 4:
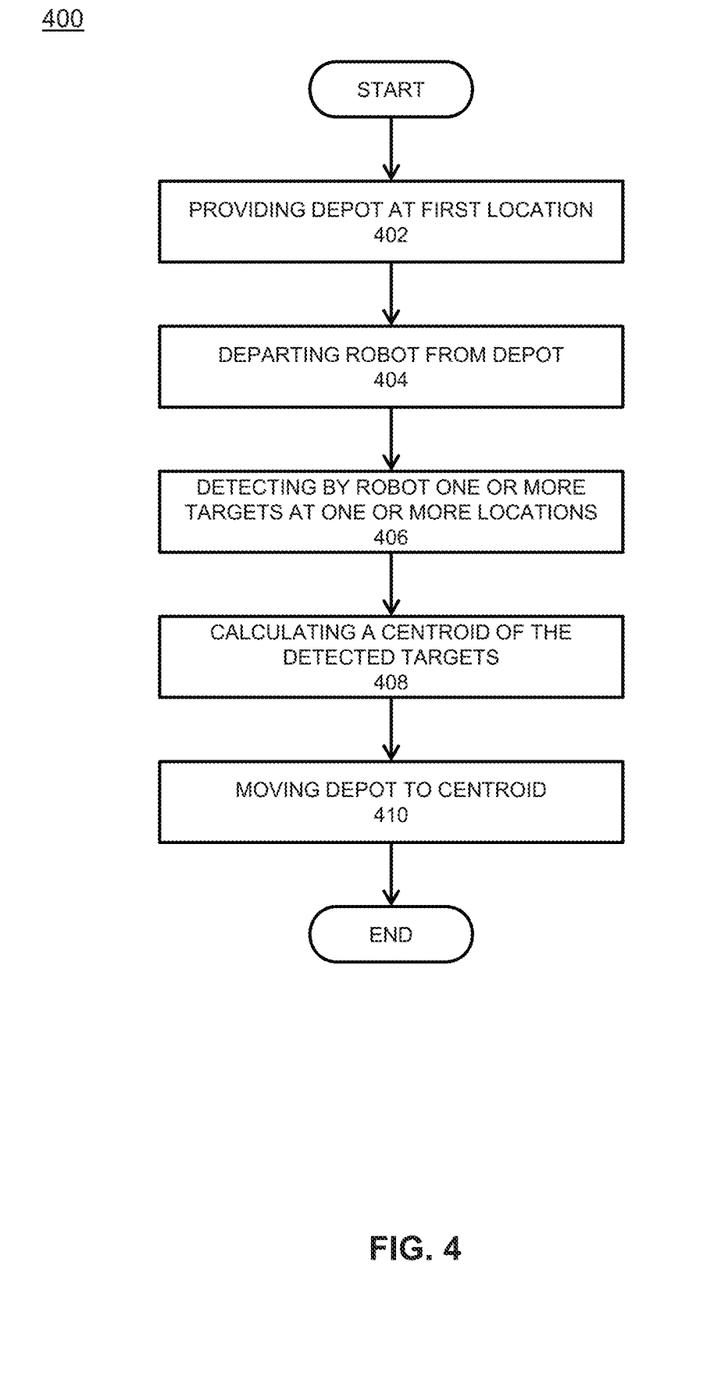
FIG. 4 illustrates a flow chart of the steps performed by a method for moving depots according to an embodiment of the invention.

FIG. 4 illustrates a flow chart 400 of the steps performed by a method for moving depots according to an embodiment of the invention. Depots move to new locations based on the positional information of observed targets sensed by foraging robots. Depots are initially distributed uniformly at step 402, and robots are evenly distributed to each depot. At step 404, the robot departs from the depot. The robots detect one or more targets each at one or more locations at step 406. For purposes of the invention, robots can sense targets within camera range, but cannot precisely measure the positions of these targets. Therefore, a robot only reports its current position and the number of targets detected; the robot's current position approximates the centroid of the targets that it has detected at step 408. Each depot is moved at step 410 to the centroid $c_t$ of the sensed targets at time t, where $c_t$ is defined by Equation 1:

$$c_t = \frac{1}{N}\sum_{i=1}^{N} w_i p_i \qquad (\text{Eq. 1})$$

where $w_i$ is the number of sensed targets at location $p_i$, and N is the total number of different locations where robots have sensed targets.

Figure 5:
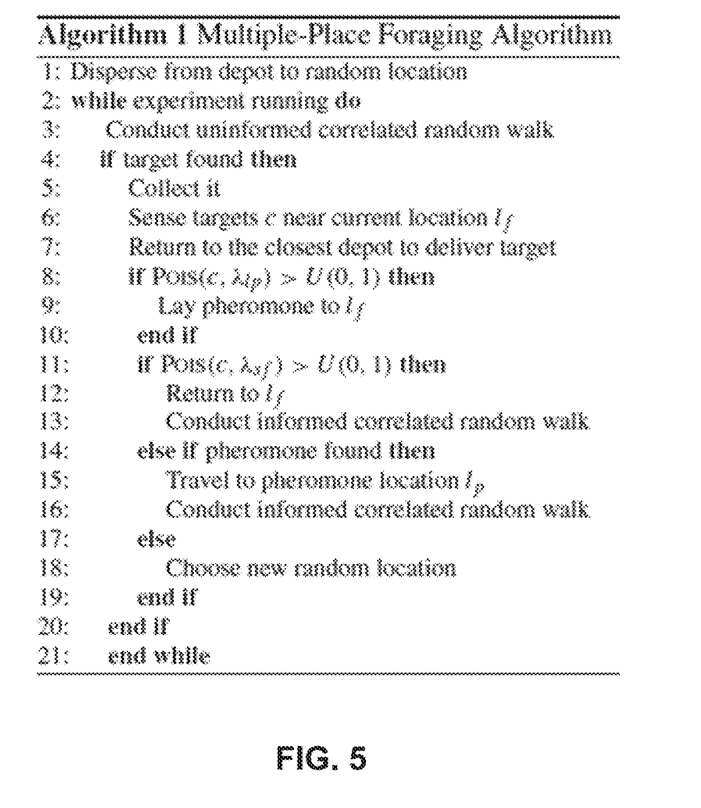
FIG. 5 is code for the MPFA encoded in a robot controller according to an embodiment of the invention.
Figure 6:
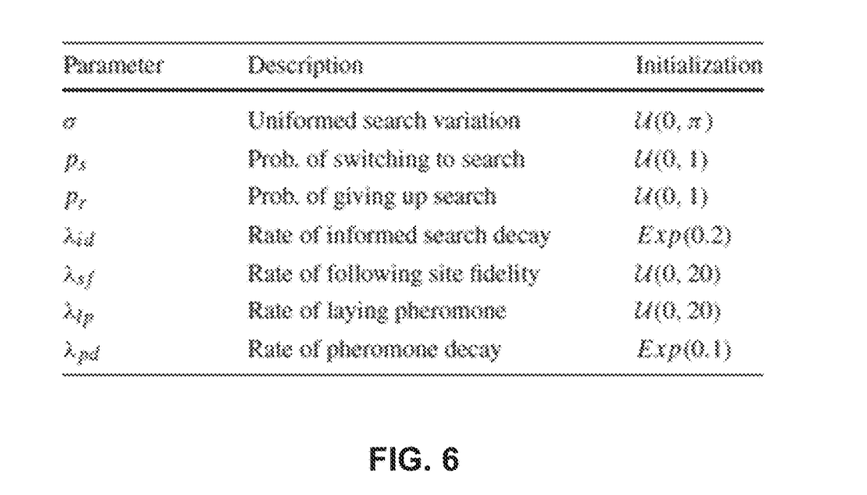
FIG. 6 is a chart of the real-valued parameters of the MPFA of FIG. 5.

According to the invention, seed-harvester ant behaviors are encoded into a robot controller according to the MPFA, illustrated in FIG. 5 using the real-valued parameters illustrated in FIG. 6 that specify movement, sensing, and communication according to a uniformed search variation, a probability of switching to a search, a probability of giving up the search, a rate of informed search decay, a rate of following site fidelity, a rate of laying pheromone, and a rate of pheromone decay.

According to uniformed search variation, uniformed robots forage using a correlated random walk with fixed step length and direction $\theta_t = \mathcal{N}(\theta_t - 1, \sigma)$, where $\theta_t - 1$ is the turning angle from the previous step, $\mathcal{N}$ is a normal distribution function and $\sigma$ is the uniformed search variation (or standard deviation), which determines the turning angle of the next step.

According to the probability of switching to search, robots start at a depot and select a direction $\theta$ from a uniform random distribution $u(0, 1)$, then travel in this direction away from the depot. Robots have a probability $p_s$ of switching to an uninformed correlated random walk, where higher values of $p_s$ indicate shorter travel distances from the depot.

According to the probability of giving up the search, at each step of the correlated random walk, robots that have not discovered a target may give up searching and return to the closest depot with probability $p_r$.

According to the rate of informed search decay, if robots return to a previous location via site fidelity or pheromone waypoint, they search using an informed correlated random walk, with standard deviation $\hat{\sigma}$ defined by Equation 2:

$$\hat{\sigma} = \sigma(2\pi - \sigma)e^{-\lambda_{id}t}$$

(Eq. 2), where $\hat{\sigma}$ is a standard deviation, $\lambda_{id}$ is a rate search decay and as time t increases, $\hat{\sigma}$ decays to $\sigma$ As time t increases, $\hat{\sigma}$ decays to $\sigma$, producing an initially undirected and localized search that becomes more correlated over time. This time decay allows robots to search locally where they expect to find a target, but to straighten their path and move to another location if no target is found.

According to the rate of following site fidelity, the probability of a robot returning to a previous target location via site fidelity is governed by the Poisson cumulative distribution function (Poisson CDF) defined by Equation 3:

$$POIS(k, \lambda_{sf}) = e^{-\lambda_{sf}} \sum_{i=0}^{\lfloor k \rfloor} \frac{\lambda_{sf}^i}{i!} \qquad (\text{Eq. 3})$$

where k is the number of additional targets detected in a previous location and the parameter $\lambda_{sf}$ is the average number of detected targets. The Poisson CDF models the probability of following site fidelity given the number of detected targets k appropriately. The probability is highest when $k = \lambda_{sf}$. Robots return to previous locations via site fidelity if the parameterized Poisson CDF exceeds a uniform random value, $POIS(k, \lambda_{sf}) > u(0,1)$, simulating a random sampling process that is weighted by the probability of following site fidelity for a given k. Otherwise, robots follow pheromone waypoints to previous target locations if pheromones are available. If no pheromone exists, robots return to traveling and searching using the uninformed correlated random walk.

According to the rate of laying pheromone, the probability of creating a pheromone waypoint is also governed by the Poisson CDF (Eq. 3). Robots create waypoints for previous target locations if $POIS(k, \lambda_{lp}) > u(0,1)$, where k is also the number of targets detected in a previous location.

According to the rate of pheromone decay, pheromone waypoint strength $\alpha$ decays exponentially over time t as defined by Equation 4:

$$\alpha = e^{-\lambda_{pd}t}$$

(Eq. 4), where $\lambda_{pd}$ is a rate of pheromone decay.

Waypoints of each pheromone trail is removed once their value drops below a threshold, for example 0.001.

As mentioned above, robot controllers are evolved using the genetic algorithm (GA) to optimize the collective behavior of the entire robot swarm, where every robot in the swarm uses the same controller. According to one embodiment, the controller is evolved in one set of simulations and evaluated in another set of simulations which are replicated 100 times. Each foraging algorithm is run until the robot swarm collects the expected percentage of targets. There are an uncountable number of foraging strategies that can be defined by the real-valued parameters of the CPFA and MPFA. Given 100 real values of each parameter, there would be 1007 possible strategies. Additionally, the online decision making of each robot depends on interactions with environmental conditions. For example, following site fidelity is determined by the condition of POIS(k, $\lambda_{sf}$)>$u$ (0, 1), as described above. The sampled value from $u$ (0,1) is random at each time, and the decision to use site fidelity depends on the value of k and the sampled random value. The GA provides a way to sample both parameter space and the effectiveness of the foraging algorithm evaluated in different environmental conditions. As an example, the parameters in FIG. 6 are independently evolved 16 times in order to generate 16 independent foraging strategies for each of the five foraging algorithms in each target distribution providing a total of 240 separate evolutionary runs (3 distributions×5 algorithms×16 replicates). Each of these evolutionary experiments follows the process described more fully below.

According to the invention, the GA is implemented using GAlib, a C++ Library of Genetic Algorithm Components. For each generation of the GA, each candidate set of 7 parameters is evaluated on 10 different random placements of targets. A 50% uniform crossover rate and a 5% Gaussian mutation rate with a standard deviation of 0.02 is used, and elitism to keep the fittest parameter set. The termination of the GA is based on three criteria: the convergence of fitness values, the diversity of parameter sets, and the number of generations. Fitness is simply defined as the number of targets collected in a specified foraging time. The GA will stop if the fitness has converged and the diversity is low; otherwise, it will terminate after a set number of generations. According to the GA of the invention, 89% of the evolutionary runs terminate based on the convergence of fitness and low diversity.

Performance of the MPFA was tested by conducting four sets of experiments using the swarm robot simulator Autonomous Robots Go Swarming (ARGoS). In the first set of experiments, the foraging times of MPFAdynamic were compared to the CPFA and MPFAstatic, as well as to the two idealized versions of the MPFA that rely upon global knowledge of target locations to determine depot locations, MPFAglobal_static and MPFAglobal_dynamic. The first set of experiments were conducted with 24 robots in a 10×10 m arena.

In the second set of experiments, scalability of these algorithms were to larger arena sizes were tested. The rate of increase in foraging times with increasing arena size were examined—24 robots in increasing arenas: 10×10 m, 12×12 m, 14×14 m, 16×16 m.

In the third set of experiments, the performance of each algorithm was tested in a very large arena (50×50 m) with 96 robots.

The fourth set of experiments account for transportation by the mobile depots to a single central collection point. In these experiments, each of the mobile depots is a modified robot that carries targets to a central collection point; thus, 4 robots are also added to the CPFA experiments, so foraging performance is evaluated with each having a 10×10 m arena with 28 robots that ultimately deliver targets to a central place.

For the first set of experiments, the parameters for the CPFA and MPFAs were each evolved separately as described above. The set of evolved parameters with the shortest foraging time is selected from the 16 sets of evolved parameters for the experiment. These sets of evolved parameters are subsequently used for the corresponding CPFA and MPFAs in the second, third and fourth experiments.

Each experiment has one central depot in the CPFA, and four depots for each of the four MPFAs. In the fourth experiment, a central depot and four dynamic depots is included in the MPFAdynamic simulations.

Foraging time is measured as the time for the entire swarm to collect 88% of the 384 placed targets. This percentage is chosen since it is the inflection point in CPFA foraging performance after which there is an exponential increase in collection time and very high variance in performance due to the sparsity of remaining targets.

In the first set of experiments, the times for different components of the foraging time are measured: travel time, search time, and collision time, described more fully below.

Figure 7A:
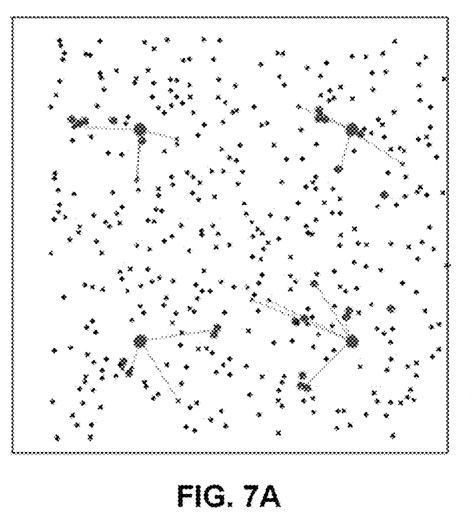
FIG. 7A is a diagram of targets unclustered and spread in a uniform random distribution according to an embodiment of the invention.
Figure 7B:
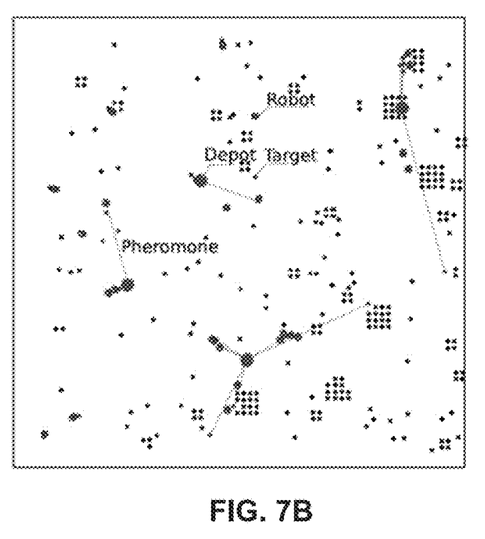
FIG. 7B is a diagram of targets partially clustered according to an embodiment of the invention.
Figure 7C:
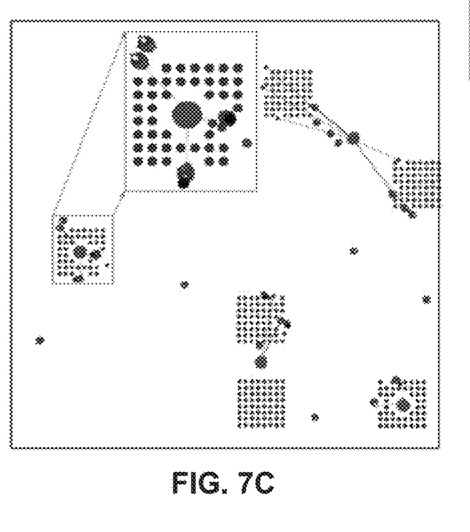
FIG. 7C is a diagram of clustered targets according to an embodiment of the invention.

Each of the five algorithms—CPFA, MPFAstatic, MPFAglobal_static, MPFAdynamic, MPFAglobal_dynamic—is tested on three different classes of target distribution: targets placed in a uniform random distribution (FIG. 7A), targets placed in a partially clustered distribution (FIG. 7B), and targets placed in a highly clustered distribution (FIG. 7C).

The partially clustered distribution uses a power law distribution of cluster sizes: 128 clusters that contain a single target, 32 clusters with 4 targets each, and 8 clusters with 16 targets each, for a total of 384 targets. This power law distribution of cluster sizes emulates that of many natural resource distributions in real-world environments. The fully clustered distribution has 6 clusters of 64 targets each.

Each experiment is replicated 100 times. For each replicate, the individual targets, or centers of target clusters, are chosen at random so that each replicate has a different target placement consistent with the distribution for that experiment. Thus, there are 1500 experimental runs (3 distributions×5 algorithms×100 replicates) for the first set of experiments, 6000 experimental runs (one for each of 4 arena sizes) for the second set of experiments, 1500 runs for the third set of experiments, and 600 runs for the fourth set of experiments, for a total of 9600 separate experimental runs.

MPFAdynamic is compared to the CPFA, MPFAstatic, MPFAglobal_static, and MPFAglobal_dynamic. Result illustrate that MPFAdynamic is faster than the CPFA and MPFAstatic, and similar in performance to MPFAglobal_static and MPFAglobal_dynamic. Results are presented in notched box plots to show which results are statistically different. Statistical significance is explicitly indicated by asterisks in the following figures (p<0.001) emphasized by the ellipses. Additionally, the notch on each plot indicates the 95% confidence interval of the medians so that overlapping ranges of the notches indicate statistically indistinguishable results at the p=0.05 level. The performance of each algorithm is represented by a notched box plot in a different shade, ordered left to right, lightest to darkest in the same order indicated in the legend. If the notches of two boxes do not overlap, this indicates a statistically significant difference between the medians.

Figure 8:
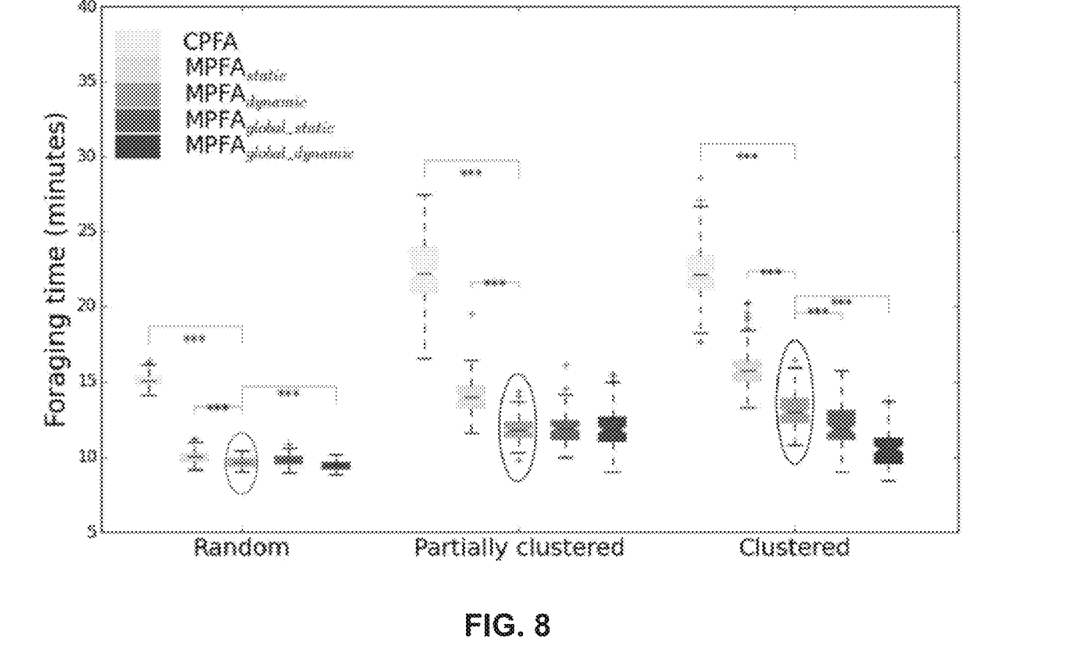
FIG. 8 is a box plot of the time for each algorithm to collect 88% of the targets for three different classes of distributions of targets according to an embodiment of the invention.

Foraging performance is examined with respect to foraging time and robustness error. Foraging time of each swarm is the time required to collect 88% of the targets. FIG. 8 shows the time for each algorithm to collect 88% of the targets for three different classes of distributions of targets. As shown in FIG. 8, MPFAdynamic outperforms the CPFA and the MPFAstatic in all three distributions. The MPFAdynamic is 47% faster than the CPFA in the partially clustered distribution and 18% faster than the MPFAstatic in the clustered distribution. Surprisingly, the MPFAdynamic is either faster than both globally informed algorithms in the clustered distribution or statistically indistinguishable from them in the partially clustered distribution. It is slightly slower than MPFAglobal_dynamic in the random distribution.

Figure 9:
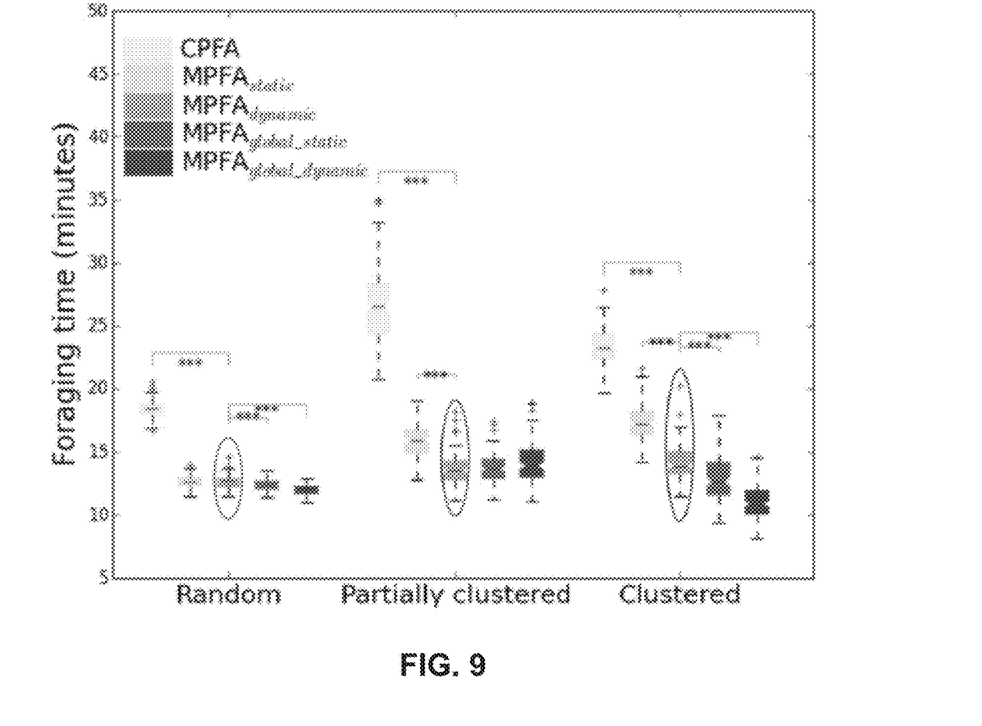
FIG. 9 is a box plot of the foraging time for swarms given simulated error with a noise coefficient e=0.4 according to an embodiment of the invention.

Robustness error, or the effect of localization error, on foraging performance is examined. FIG. 9 shows foraging time for swarms given simulated error with a noise coefficient e=0.4. This error results in robots returning to pheromone or site fidelity way-points at the far corner of a 10×10 m arena being normally distributed around the intended destination, with 68% of the robots within 3 m of the intended destination, a substantial amount of error when searching for targets that are 5 cm in radius. The experiments show that the foraging times of all algorithms increase moderately (on average by 16%) with this level of error. However, MPFAdynamic still outperforms the CPFA and MPFAstatic in all three distributions with statistical significance levels similar to the error-free evaluations.

Figure 10A:
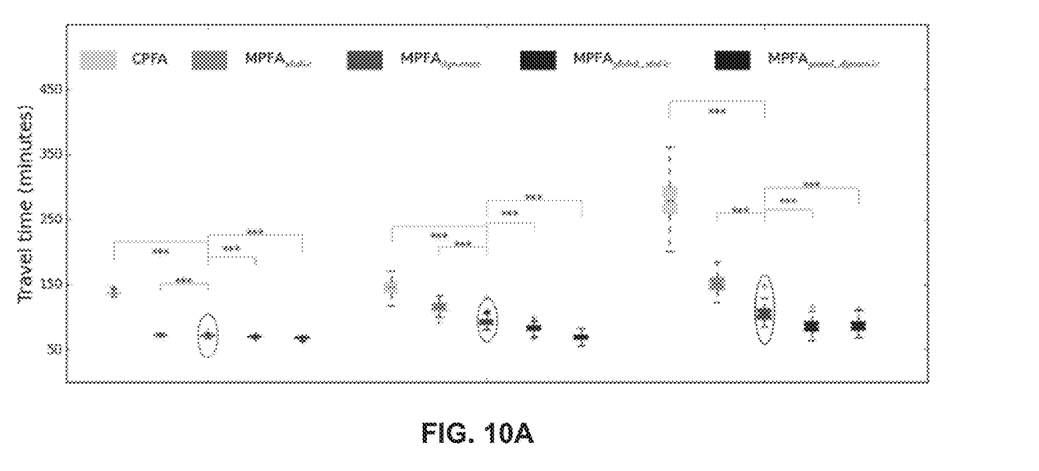
FIG. 10A is a box plot of the total travel time spent by all robots in each swarm according to an embodiment of the invention.
Figure 10B:
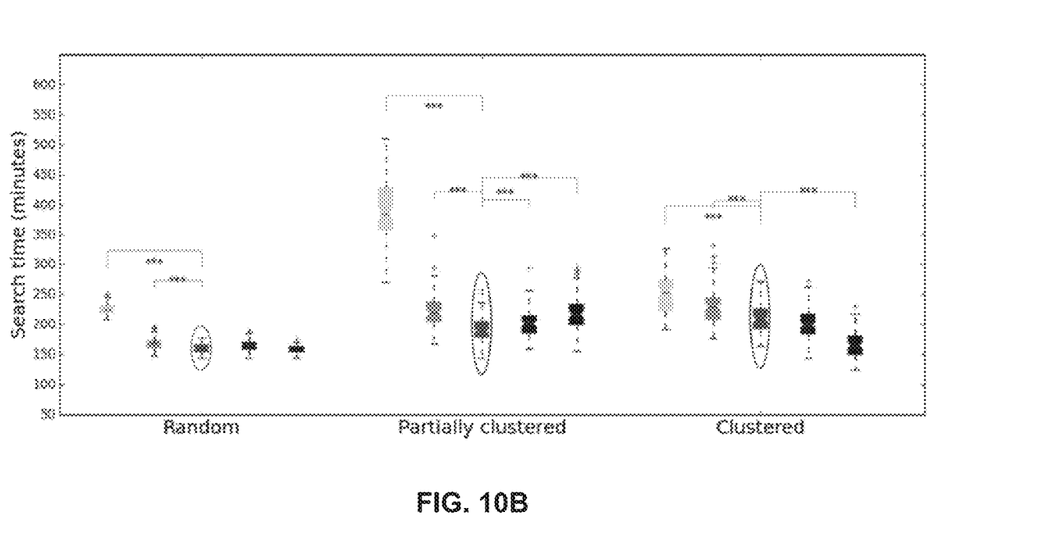
FIG. 10B is a box plot of the total search time spent by all robots in each swarm according to an embodiment of the invention.

Foraging time is composed of two distinct activities. When a robot departs from a depot, it travels to a location where it starts a localized search for targets. Once a target is discovered, the robot takes approximately the same travel time back to the depot as it took to travel to the search location. The total travel time and search time spent by all robots in the swarm is measured. The summed travel time and search time of all robots in each swarm are shown in FIG. 10A and FIG. 10B, respectively. In the MPFAdynamic, travel time is reduced in all cases. Compared to the CPFA, the MPFAdynamic is up to 62% faster (in the clustered distribution); compared to the MPFAstatic it is up to 30% faster (in the clustered distribution). Robots using the MPFAdynamic also search faster in all cases. Compared to the CPFA it is up to 51% faster (in the partially clustered distribution), and compared to the MPFAstatic (up to 13.6% faster in the partially clustered distribution). It is also faster than the globally informed MPFAs in the partially clustered distribution. It is slightly slower than MPFAglobal_dynamic in the clustered distribution.

According to an embodiment of the invention, if the distance between two robots is less than 25 cm, each robot will implement collision avoidance. Each robot senses the location of the other and turns left or right in order to avoid a collision, moving approximately 8 cm before resuming traveling. The collision avoidance takes time and will increase foraging times, particularly when the swarm size is large.

Figure 11:
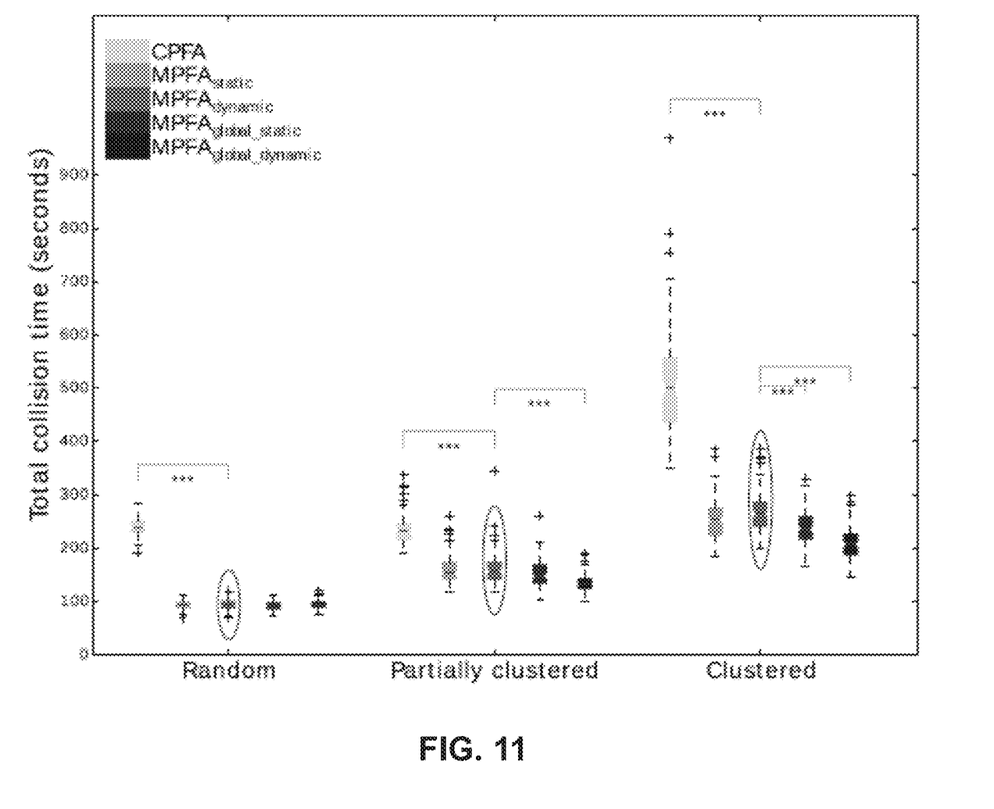
FIG. 11 is a box plot of the total time spent per swarm avoiding collisions according to an embodiment of the invention.

Collision time is the time spent to avoid a collision. The total collision time of each swarm is the sum of the total collision avoidance times for all robots in the swarm shown in FIG. 11. The collision time for MPFAdynamic is less than the collision time for the CPFA in all cases, but it is more than the collision time for the globally informed algorithm with dynamic depots in the partially clustered distribution and for both globally informed algorithms in the clustered distribution. Not surprisingly, collision time is lowest in the random distribution where targets and robots are most dispersed, and highest in the clustered distribution where robots crowd around clustered target locations.

Figure 12:
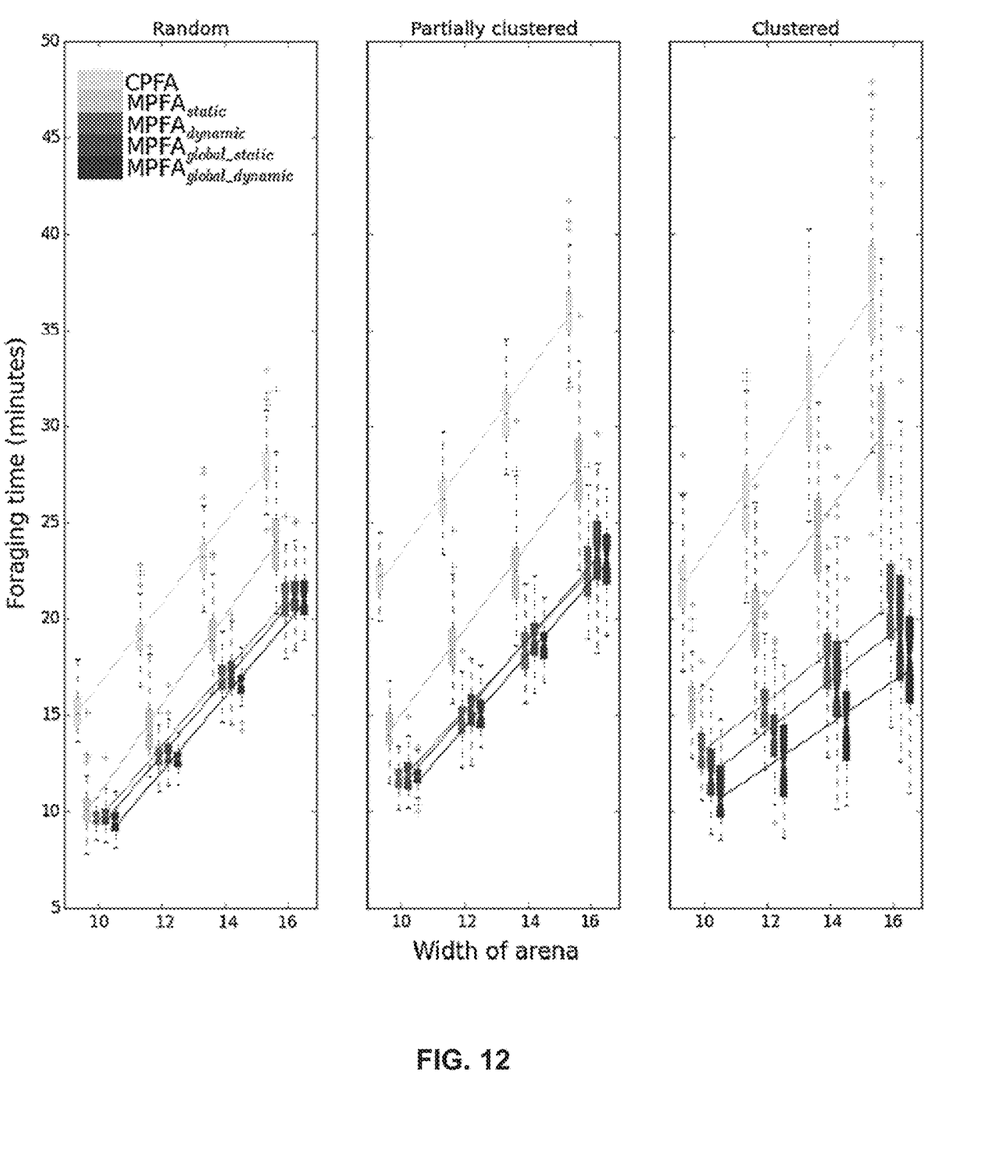
FIG. 12 is a box plot of the foraging time for each swam in various arena sizes and swarm sizes according to an embodiment of the invention.

FIG. 12 is a box plot of the foraging time for each swam for increasing arena sizes and swarm sizes according to an embodiment of the invention. As shown in FIG. 12, foraging time increases as the arena size increases. MPFAdynamic outperforms the CPFA and MPFAstatic in all arena sizes and all three distributions. Its performance is similar to MPFAglobal_static and MPFAglobal_dynamic. The increase in foraging time is linear with the length of the foraging arena. However, in the clustered target environment, MPFAdynamic (slope=2.55), MPFAglobal_static (slope=2.56), and MPFAglobal_dynamic (slope=2.21) have improved scalability compared to the CPFA (slope=5.04) and MPFAstatic (slope=4.61) as evidenced by the more shallow increase in per-robot foraging time with arena size. The slope of the regression for MPFAdynamic is not significantly different from that of MPFAglobal_static and MPFAglobal_dynamic.

Figure 13:
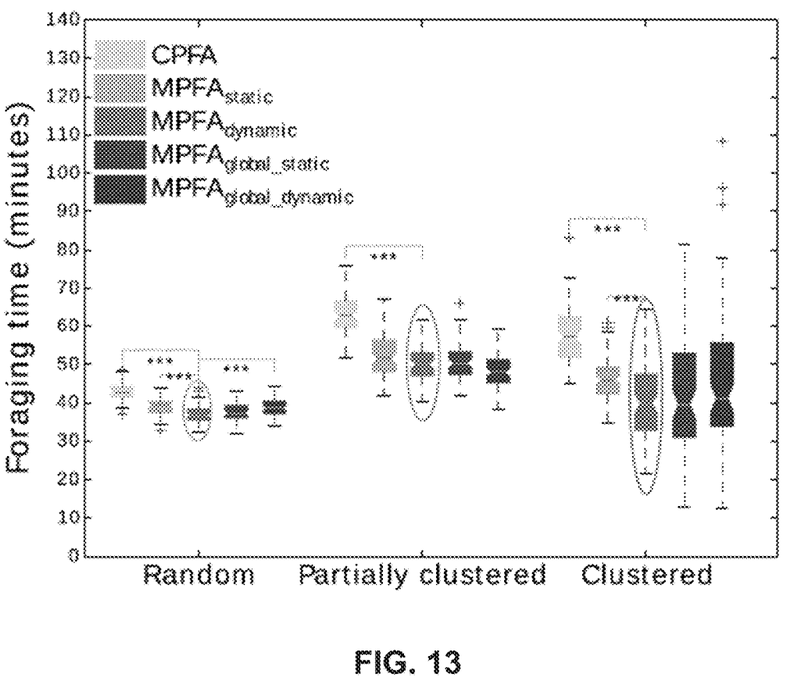
FIG. 13 is a box plot of foraging times for certain swarms according to an embodiment of the invention.

To further test scalability, an arena is created 25 times larger (50×50 m) than the basic (10×10 m) arena and foraging times for swarms of 96 robots are measured. FIG. 13 shows foraging performance in this larger arena. MPFAdynamic still outperforms the CPFA (up to 30% in the clustered distribution) and MPFAstatic (up to 13% in the clustered distribution) in most cases. The MPFAdynamic is either better than or statistically indistinguishable from the MPFAglobal_static and MPFAglobal_dynamic in all cases suggesting that the MPFAdynamic is particularly effective for very large swarms and foraging areas. Again, asterisks indicate a statistically significant difference ($p<0.001$) with the MPFAdynamic emphasized by ellipses.

The results demonstrate that by using mobile depots that adapt to local conditions, MPFAdynamic is an efficient and scalable solution that minimizes the central-place bottleneck of the CPFA and improves foraging times compared to MPFAstatic without requiring any global information (as required by MPFAglobal_static and MPFAglobal_dynamic).

Real-time adaptive response is a key component of MPFAdynamic. Foraging robots adaptively respond to the targets they detect in the environment by making a real-time decision to communicate pheromones or to return to a previous search location using site fidelity. Depots make real-time adjustments each time a foraging robot drops off a target in order to move toward the centroid of the known target locations. The CPFA and MPFAstatic are both effective algorithms; however, the additional real-time decision-making of mobile depots decreases foraging times as shown in the above described experiments, and the decrease is greatest in the largest arenas and for clustered target distributions (FIG. 13).

MPFAdynamic is particularly effective compared to MPFAstatic for highly clustered targets. Foraging robots adaptively respond to clusters by using pheromones and site fidelity; in turn, depots respond to the observations of the foraging robots by moving closer to clusters of targets. Thus, both foragers and depots respond to the environment to reduce the time to collect targets. The adaptive communication of foragers reduces search time, and the adaptive movement of depots reduces travel time. Real-time adaptation to communicated information about target locations is particularly valuable when targets are highly clustered because each target found in a cluster confers more information about the location of other targets in that cluster. The benefits of dynamic depot movement are likely to be even greater when targets are ephemeral—i.e., appearing and disappearing over time—and when the targets themselves are mobile because depots can move to new locations where targets appear so that they can be collected quickly. In addition to real-time decision-making, robots also respond adaptively to their environments over evolutionary time.

Figure 14:
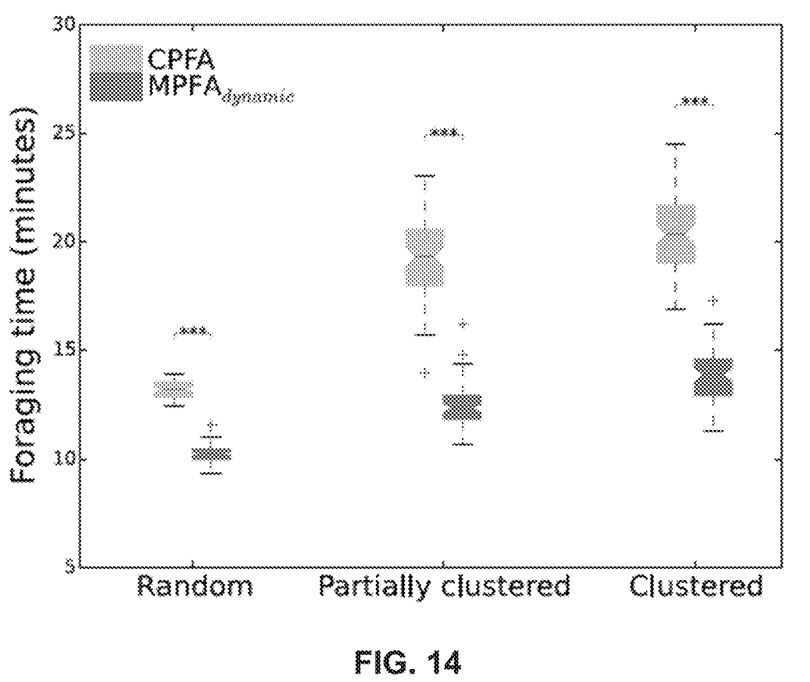
FIG. 14 is a box plot of foraging times for certain swarms according to an embodiment of the invention.

MPFAdynamic offers a new perspective on the scaling problem. The use of multiple depots in the MPFA improves scaling compared to the CPFA, and having adaptive and dynamic mobile depots increases scalability even further. This advantage is particularly apparent when the targets to be transported are grouped into clusters, rather than randomly scattered, and when transport distances are very large (i.e., MPFAdynamic is nearly twice as fast as the CPFA and MPFAstatic for clustered targets in the largest 50×50 m arena as shown in FIG. 13). This suggests that adaptive mobile agents in robotic swarms can mitigate the inherent scaling inefficiencies of central-place transport. The experiments in FIG. 14 show that this holds even when the dispersed depots transport targets to a central nest.

The success of MPFAdynamic also provides insight into biological mechanisms that improve scalability. While most biological scaling theory focuses on fixed, centralized transport networks, there are biological systems that have features similar to the depots of the MPFA. For example, the immune system, with multiple lymph nodes distributed throughout the search space of an organism, results in a highly scalable immune response with trillions of cells. Our prior works suggest that the partially distributed architecture of the immune system (one in which lymph nodes act as depots) is critical for overcoming the inherent scaling limitations of transporting targets.

There is also evidence of mobile depots in the largest colonies of ants: invasive Argentine ant colonies are composed of a network of mobile nests connected by trails, and the dynamic patterns of recruitment and allocation of foragers to nests increases foraging efficiency. These examples suggest that in biological systems, as well as in robotic swarms, adaptive, decentralized, and mobile aggregation points increase search efficiency. Thus, biological systems have evolved architectures with the same advantages of MPFAdynamic: faster search and foraging, fewer collisions, and reduced travel time.

While the invention is susceptible to various modifications and alternative forms, specific exemplary embodiments are shown by way of example in the following drawings which are described in detail. It should be understood, however, that there is no intent to limit the invention to the particular embodiments disclosed. On the contrary, the intention is to cover all modifications, equivalents, and alternatives 5 falling within the scope of the invention as defined by the appended claims.

The invention claimed is:

1. A method for multiple-place swarm foraging comprising the steps of:
   providing an environment comprising a plurality of targets, a plurality of robots and a plurality of dynamic depots;
   departing from a dynamic depot a robot;
   following by the robot a randomly selected travel path;
   searching for one or more targets by the robot, wherein the robot has no knowledge of target locations;
   finding by the robot one or more targets in a region;
   sensing by the robot a number of targets in the region;
   collecting the one or more targets; and
   delivering the one or more targets to a dynamic depot closest to the robot.

2. The method according to claim 1, further comprising the steps of:
   comparing a number of collected targets to a predetermined number or a dynamic threshold number;
   departing again from the dynamic depot the robot if the number of collected targets do not meet or exceed the predetermined number or the dynamic threshold number;
   returning by the robot to the previously found target site, wherein the robot has knowledge of target locations using site fidelity or pheromone recruitment; and
   searching by the robot for one or more targets using an informed correlated random walk.

3. The method according to claim 1, further comprising the steps of:
   comparing a number of collected targets to a predetermined number or a dynamic threshold number;
   departing again from the dynamic depot the robot if the number of collected targets do not meet or exceed the predetermined number or the dynamic threshold number; and
   searching for one or more targets by the robot, wherein the robot has no knowledge of target locations.

4. The method according to claim 1, further comprising the steps of:
   reporting by the robot its current position and a number of targets detected;
   approximating a centroid of the one or more targets; and
   moving the dynamic depot to the centroid $c_t$.

5. The method according to claim 4, wherein $c_t$ is defined by:

$$c_t = \frac{1}{N}\sum_{i=1}^{N} w_i p_i$$

where $w_i$ is the number of sensed targets at location $p_i$, and N is the total number of different locations where robots have sensed targets.

6. The method according to claim 1, wherein the randomly selected travel path of the following step is defined by: $\theta_t = N(\theta_t-1, \sigma)$, where $\theta_t-1$ is a turning angle from a previous step, N is a normal distribution function and $\sigma$ is an uninformed search variation that determines the turning angle of the next step.

7. The method according to claim 2, wherein the informed correlated random walk of the searching step is defined by:

$$\hat{\sigma} = \sigma(2\pi - \sigma)e^{-\lambda_{id}t}$$

where $\hat{\sigma}$ is a standard deviation, $\lambda_{id}$ is a rate of informed search decay and as time t increases, $\hat{\sigma}$ decays to $\sigma$.

8. The method according to claim 2, wherein pheromone recruitment comprise the steps of:
   simulating pheromone trails using pheromone waypoints;
   reporting pheromone waypoints to the depot closest to the robot when the robot arrives at the depot;
   decaying exponentially strength of a pheromone waypoint; and
   removing the pheromone waypoint from the environment that has decayed below a threshold number.

9. The method according to claim 8, wherein the threshold number is 0.001.

10. The method according to claim 8, wherein pheromone waypoint strength $\gamma$ decays exponentially over time t as defined by: $\gamma = e^{-\lambda_{pd}t}$, where $\lambda_{pd}$ is a rate of pheromone decay.

11. A method for multiple-place swarm foraging comprising the steps of:
   providing an environment comprising a plurality of targets, a plurality of robots and a plurality of dynamic depots;
   departing from a dynamic depot a robot;
   following by the robot a randomly selected travel path;
   searching for one or more targets by the robot, wherein the robot has no knowledge of target locations;
   finding by the robot one or more targets in a region;
   sensing by the robot a number of targets in the region;

reporting by the robot its current position and the number of targets detected;
approximating a centroid of the one or more targets;
moving the dynamic depot to the centroid;
collecting the one or more targets; and
delivering the one or more targets to the centroid of the dynamic depot.

12. The method according to claim 11, wherein the centroid $c_t$ is defined by:

$$c_t = \frac{1}{N}\sum_{i=1}^{N} w_i p_i$$

where $w_i$ is the number of sensed targets at location $p_i$, and N is the total number of different locations where robots have sensed targets.

13. A system for multiple-place swarm foraging in an environment comprising:

a plurality of targets;
a plurality of robots;
a plurality of dynamic depots, wherein each of the dynamic depots is configured to move closer to a centroid of one or more targets of the plurality in the environment according to a number of sensed targets at location and a total number of different locations where one or more robots of the plurality have sensed targets.

14. The system according to claim 13, wherein the centroid $c_t$ is defined by:

$$c_t = \frac{1}{N}\sum_{i=1}^{N} w_i p_i$$

where $w_i$ is the number of sensed targets at location $p_i$, and N is the total number of different locations where robots have sensed targets.

* * * * *